United States Patent
Bakshi et al.

(10) Patent No.: US 10,354,647 B2
(45) Date of Patent: Jul. 16, 2019

(54) CORRECTING VOICE RECOGNITION USING SELECTIVE RE-SPEAK

(71) Applicant: Google LLC, Mountain View, CA (US)

(72) Inventors: Dhruv Bakshi, Zurich (CH); Zaheed Sabur, Adliswil (CH); Tilke Mary Judd, Zurich (CH); Nicholas G. Fey, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/140,891

(22) Filed: Apr. 28, 2016

(65) Prior Publication Data

US 2016/0322049 A1 Nov. 3, 2016

Related U.S. Application Data

(60) Provisional application No. 62/153,839, filed on Apr. 28, 2015.

(51) Int. Cl.
*G10L 15/00* (2013.01)
*G10L 15/08* (2006.01)
(Continued)

(52) U.S. Cl.
CPC .......... *G10L 15/22* (2013.01); *G06F 16/3329* (2019.01); *G06F 16/632* (2019.01);
(Continued)

(58) Field of Classification Search
CPC ....... G10L 15/22; G10L 15/26; G10L 15/265; G10L 15/30; G10L 15/1815; G06F 17/273
(Continued)

(56) References Cited

U.S. PATENT DOCUMENTS

| 4,328,562 A | 5/1982 | Hashimoto |
| 4,866,778 A | 9/1989 | Baker |

(Continued)

FOREIGN PATENT DOCUMENTS

| CN | 1538383 A | 10/2004 |
| CN | 1555553 | 12/2004 |

(Continued)

OTHER PUBLICATIONS

Frey, B., et al., "Algonquin: Iterating Laplace's Method to Remove Multiple Types of Acoustic Distortion for Robust Speech Recognition", EUROSPEECH 2001 Scandinavia, 7th European Conference on Speech Communication and Technology, Aalborg, Denmark, Sep. 3-7, 2001, [online]. research.microsoft.com [retrieved on Nov. 23, 2010]. Retrieved from the Internet: <URL: http://research.microsoft.com/pubs/76516/2001-frey-eurospeech.pdf>, 4 pages.

(Continued)

*Primary Examiner* — Olujimi A Adesanya
(74) *Attorney, Agent, or Firm* — Fish & Richardson P.C.

(57) ABSTRACT

Implementations of the present disclosure include actions of providing first text for display on a computing device of a user, the first text being provided from a first speech recognition engine based on first speech received from the computing device, and being displayed as a search query, receiving a speech correction indication from the computing device, the speech correction indication indicating a portion of the first text that is to be corrected, receiving second speech from the computing device, receiving second text from a second speech recognition engine based on the second speech, the second speech recognition engine being different from the first speech recognition engine, replacing the portion of the first text with the second text to provide a combined text, and providing the combined text for display on the computing device as a revised search query.

15 Claims, 7 Drawing Sheets

(51) Int. Cl.

| | | |
|---|---|---|
| *G10L 15/22* | (2006.01) | |
| *G06F 16/632* | (2019.01) | |
| *G06F 16/638* | (2019.01) | |
| *G06F 16/683* | (2019.01) | |
| *G06F 17/27* | (2006.01) | |
| *G10L 15/26* | (2006.01) | |
| *G10L 15/32* | (2013.01) | |
| *G06F 16/332* | (2019.01) | |

(52) U.S. Cl.
CPC .......... *G06F 16/638* (2019.01); *G06F 16/685* (2019.01); *G06F 17/273* (2013.01); *G10L 15/26* (2013.01); *G10L 15/32* (2013.01); *G10L 2015/223* (2013.01)

(58) Field of Classification Search
USPC ................................. 704/231, 235, 246, 270
See application file for complete search history.

(56) References Cited

U.S. PATENT DOCUMENTS

| | | |
|---|---|---|
| 5,027,406 A | 6/1991 | Roberts |
| 5,500,920 A | 3/1996 | Kupiec |
| 5,510,981 A | 4/1996 | Berger |
| 5,712,957 A | 1/1998 | Waibel |
| 5,737,724 A | 4/1998 | Atal |
| 5,794,189 A | 8/1998 | Gould |
| 5,799,273 A | 8/1998 | Mitchell |
| 5,799,279 A | 8/1998 | Gould |
| 5,829,000 A * | 10/1998 | Huang .................... G10L 15/22 704/240 |
| 5,855,000 A | 12/1998 | Waibel |
| 5,857,099 A | 1/1999 | Mitchell |
| 5,864,805 A * | 1/1999 | Chen ....................... G10L 15/22 704/235 |
| 5,909,667 A | 6/1999 | Leontiades |
| 5,960,394 A | 9/1999 | Gould |
| 5,970,451 A | 10/1999 | Lewis |
| 6,064,959 A | 5/2000 | Young |
| 6,067,521 A * | 5/2000 | Ishii ....................... G10L 15/22 701/532 |
| 6,070,140 A | 5/2000 | Tran |
| 6,088,671 A | 7/2000 | Gould |
| 6,138,099 A * | 10/2000 | Lewis ..................... G10L 15/22 704/235 |
| 6,182,028 B1 | 1/2001 | Karaali |
| 6,192,343 B1 | 2/2001 | Morgan |
| 6,195,635 B1 | 2/2001 | Wright |
| 6,195,637 B1 | 2/2001 | Ballard |
| 6,219,640 B1 | 4/2001 | Basu |
| 6,286,064 B1 | 9/2001 | King |
| 6,314,397 B1 | 11/2001 | Lewis |
| 6,327,566 B1 * | 12/2001 | Vanbuskirk ......... G10L 15/1822 704/231 |
| 6,338,035 B1 | 1/2002 | Mori |
| 6,374,214 B1 | 4/2002 | Friedland |
| 6,374,220 B1 | 4/2002 | Kao |
| 6,374,221 B1 | 4/2002 | Haimi |
| 6,397,180 B1 | 5/2002 | Jaramillo |
| 6,405,170 B1 | 6/2002 | Phillips |
| 6,490,561 B1 | 12/2002 | Wilson |
| 6,513,005 B1 | 1/2003 | Qin |
| 6,581,033 B1 | 6/2003 | Reynar |
| 6,587,824 B1 * | 7/2003 | Everhart ................. G10L 15/07 704/243 |
| 6,606,598 B1 | 8/2003 | Holthouse |
| 6,735,565 B2 | 5/2004 | Gschwendtner |
| 6,912,498 B2 | 6/2005 | Stevens |
| 6,922,669 B2 | 7/2005 | Schalk |
| 7,085,716 B1 | 8/2006 | Even |
| 7,149,970 B1 | 12/2006 | Pratley |
| 7,200,555 B1 | 4/2007 | Ballard |
| 7,216,077 B1 | 5/2007 | Padmanabhan |
| 7,310,600 B1 | 12/2007 | Garner |
| 7,366,668 B1 | 4/2008 | Franz |
| 7,383,185 B1 | 6/2008 | Mohri |
| 7,440,895 B1 | 10/2008 | Miller |
| 7,444,286 B2 | 10/2008 | Roth |
| 7,542,902 B2 | 6/2009 | Scahill |
| 7,565,282 B2 | 7/2009 | Carus |
| 7,634,408 B1 | 12/2009 | Mohri |
| 7,689,420 B2 | 3/2010 | Paek |
| 7,756,710 B2 | 7/2010 | Franco |
| 7,809,574 B2 | 10/2010 | Roth |
| 7,840,407 B2 | 11/2010 | Strope |
| 7,890,326 B2 | 2/2011 | Strope |
| 7,930,168 B2 | 4/2011 | Weng |
| 7,949,524 B2 | 5/2011 | Saitoh |
| 7,949,533 B2 | 5/2011 | Braho |
| 7,974,844 B2 | 7/2011 | Sumita |
| 7,983,912 B2 | 7/2011 | Hirakawa |
| 8,036,464 B2 | 10/2011 | Sridhar |
| 8,155,959 B2 | 4/2012 | Weng |
| 8,209,175 B2 | 6/2012 | Mukerjee |
| 8,355,914 B2 | 1/2013 | Joh |
| 8,438,142 B2 | 5/2013 | Wu |
| 8,478,590 B2 | 7/2013 | LeBeau |
| 8,494,852 B2 | 7/2013 | LeBeau |
| 8,504,372 B2 | 8/2013 | Carraux |
| 8,620,659 B2 * | 12/2013 | Di Cristo .............. G06F 17/273 704/251 |
| 8,775,175 B1 | 7/2014 | Nagel |
| 8,831,946 B2 | 9/2014 | Mamou |
| 8,972,240 B2 | 3/2015 | Brockett |
| 9,087,517 B2 | 7/2015 | LeBeau |
| 9,123,339 B1 | 9/2015 | Shaw |
| 9,190,055 B1 * | 11/2015 | Kiss ....................... G10L 15/07 |
| 9,263,048 B2 | 2/2016 | LeBeau |
| 9,418,152 B2 | 8/2016 | Nissan |
| 9,466,287 B2 | 10/2016 | LeBeau et al. |
| 9,542,932 B2 | 1/2017 | LeBeau et al. |
| 9,711,145 B2 | 7/2017 | LeBeau et al. |
| 9,875,738 B2 * | 1/2018 | Skobeltsyn ............ G10L 15/22 |
| 2001/0041978 A1 | 11/2001 | Crespo |
| 2002/0052740 A1 | 5/2002 | Charlesworth |
| 2002/0052742 A1 | 5/2002 | Thrasher |
| 2002/0091520 A1 | 7/2002 | Endo |
| 2002/0111990 A1 | 8/2002 | Wood |
| 2002/0138265 A1 | 9/2002 | Stevens |
| 2003/0104839 A1 | 6/2003 | Kraft |
| 2003/0182113 A1 | 9/2003 | Huang |
| 2003/0187642 A1 | 10/2003 | Ponceleon |
| 2003/0200093 A1 | 10/2003 | Lewis |
| 2003/0216912 A1 * | 11/2003 | Chino .................... G10L 15/22 704/231 |
| 2003/0229497 A1 | 12/2003 | Wilson |
| 2004/0006481 A1 | 1/2004 | Kiecza |
| 2004/0030556 A1 | 2/2004 | Bennett |
| 2004/0153321 A1 | 8/2004 | Chung |
| 2004/0249637 A1 | 12/2004 | Baker |
| 2005/0005240 A1 | 1/2005 | Reynar |
| 2005/0033574 A1 | 2/2005 | Kim et al. |
| 2005/0043949 A1 | 2/2005 | Roth |
| 2005/0055209 A1 | 3/2005 | Epstein |
| 2005/0086059 A1 | 4/2005 | Bennett |
| 2005/0091054 A1 | 4/2005 | Thrasher |
| 2005/0102140 A1 | 5/2005 | Davne |
| 2005/0203751 A1 | 9/2005 | Stevens |
| 2005/0256710 A1 | 11/2005 | Pankert |
| 2006/0036438 A1 | 2/2006 | Chang |
| 2006/0041427 A1 | 2/2006 | Yegnanarayanan |
| 2006/0085186 A1 | 4/2006 | Ma |
| 2006/0095268 A1 | 5/2006 | Yano |
| 2006/0149551 A1 | 7/2006 | Ganong |
| 2006/0215821 A1 | 9/2006 | Rokusek |
| 2006/0287868 A1 * | 12/2006 | Ikeda ..................... G10L 15/22 704/275 |
| 2006/0293889 A1 | 12/2006 | Kiss |
| 2006/0293890 A1 | 12/2006 | Blair |
| 2007/0001012 A1 | 1/2007 | Kim |
| 2007/0005372 A1 | 1/2007 | Huning |
| 2007/0033037 A1 | 2/2007 | Mowatt |

(56) References Cited

U.S. PATENT DOCUMENTS

| | | |
|---|---|---|
| 2007/0073540 A1* | 3/2007 | Hirakawa ............... G10L 15/22 704/252 |
| 2007/0094022 A1 | 4/2007 | Koo |
| 2007/0100635 A1 | 5/2007 | Mahajan |
| 2007/0106492 A1 | 5/2007 | Kim |
| 2007/0136060 A1 | 6/2007 | Hennecke |
| 2007/0150275 A1 | 6/2007 | Garner |
| 2007/0233482 A1 | 10/2007 | Lee |
| 2008/0052073 A1* | 2/2008 | Goto ....................... G10L 15/06 704/251 |
| 2008/0059167 A1 | 3/2008 | Poultney |
| 2008/0059186 A1 | 3/2008 | Mowatt |
| 2008/0077859 A1 | 3/2008 | Schabes |
| 2008/0126091 A1 | 5/2008 | Clark |
| 2008/0162137 A1 | 7/2008 | Saitoh et al. |
| 2008/0235017 A1 | 9/2008 | Satomura |
| 2008/0243507 A1 | 10/2008 | Gopinath |
| 2008/0300874 A1 | 12/2008 | Gavalda |
| 2008/0319744 A1 | 12/2008 | Goldberg |
| 2009/0012792 A1* | 1/2009 | Low ........................ G10L 15/22 704/252 |
| 2009/0067719 A1 | 3/2009 | Sridhar |
| 2009/0271189 A1 | 10/2009 | Agapi |
| 2009/0306980 A1 | 12/2009 | Shin |
| 2009/0306995 A1 | 12/2009 | Weng |
| 2009/0313016 A1* | 12/2009 | Cevik .................... G10L 15/22 704/241 |
| 2009/0326938 A1 | 12/2009 | Marila |
| 2009/0327279 A1 | 12/2009 | Adachi |
| 2010/0004930 A1 | 1/2010 | Strope |
| 2010/0076765 A1 | 3/2010 | Zweig |
| 2010/0179801 A1 | 7/2010 | Huynh |
| 2010/0179812 A1* | 7/2010 | Jang ..................... G10L 15/065 704/244 |
| 2010/0287486 A1 | 11/2010 | Coddington |
| 2011/0054900 A1* | 3/2011 | Phillips .................. G10L 15/30 704/235 |
| 2011/0066970 A1 | 3/2011 | Burrier |
| 2011/0112837 A1 | 5/2011 | Kurki-Suonio |
| 2011/0112921 A1* | 5/2011 | Kennewick ........ G06Q 30/0601 705/26.1 |
| 2011/0125499 A1 | 5/2011 | Griggs |
| 2011/0137653 A1 | 6/2011 | Ljolje |
| 2011/0145224 A1 | 6/2011 | Bangalore |
| 2011/0161079 A1 | 6/2011 | Gruhn |
| 2011/0161347 A1 | 6/2011 | Johnston |
| 2011/0166851 A1 | 7/2011 | LeBeau |
| 2011/0202386 A1 | 8/2011 | Hamlisch |
| 2012/0016671 A1 | 1/2012 | Jaggi |
| 2012/0022868 A1 | 1/2012 | LeBeau |
| 2012/0059652 A1 | 3/2012 | Adams |
| 2012/0059653 A1 | 3/2012 | Adams |
| 2012/0203776 A1 | 8/2012 | Nissan |
| 2012/0215539 A1 | 8/2012 | Juneja |
| 2012/0232904 A1* | 9/2012 | Zhu ....................... G10L 15/22 704/254 |
| 2013/0030805 A1 | 1/2013 | Suzuki |
| 2013/0262117 A1* | 10/2013 | Heckmann ............ G10L 15/22 704/255 |
| 2013/0304467 A1 | 11/2013 | LeBeau |
| 2014/0058732 A1 | 2/2014 | Labsky et al. |
| 2014/0108453 A1* | 4/2014 | Venkataraman ............................ G06F 17/30997 707/774 |
| 2015/0058018 A1* | 2/2015 | Georges ................. G10L 15/08 704/257 |
| 2015/0294668 A1 | 10/2015 | LeBeau |
| 2016/0063994 A1* | 3/2016 | Skobeltsyn ........... G06F 17/271 704/257 |
| 2016/0063998 A1* | 3/2016 | Krishnamoorthy ..... G10L 15/02 704/254 |
| 2016/0092447 A1* | 3/2016 | Venkataraman ............................ G06F 17/30038 707/765 |
| 2017/0270926 A1 | 9/2017 | LeBeau et al. |

FOREIGN PATENT DOCUMENTS

| | | |
|---|---|---|
| CN | 1758211 A | 4/2006 |
| CN | 101042867 | 9/2007 |
| CN | 101238508 A | 8/2008 |
| EP | 1094445 | 4/2001 |
| JP | 2009-086063 | 4/2009 |
| JP | 2008090625 A | 5/2010 |
| KR | 2009097292 A | 9/2009 |

OTHER PUBLICATIONS

Kristjansson, T., et al., "Super-Human Multi-Talker Speech Recognition: The IBM 2006 Speech Separation Challenge System", INTERSPEECH 2006: ICSLP; Proceedings of the Ninth International Conference on Spoken Language Process, Sep. 17-21, 2006, Pittsburgh, Pennsylvania, USA, Bonn, ISCA, 2006, 4 pages.

Zweig, G., "New Methods for the Analysis of Repeated Utterances", INTERSPEECH 2009, 10th Annual Conference of the International Speech Communication Association, Brighton, United Kingdom, Sep. 6-10, 2009, 4 pages.

Zweig, G., et al., "Structured Models for Joint Decoding of Repeated Utterances", INTERSPEECH 2008, 9th Annual Conference of the International Speech Communication Association, Brisbane, Australia, Sep. 22-26, 2008, 4 pages.

Office Action issued in Chinese Application No. 201180008973.4 dated Sep. 5, 2014, 21 pages (with English translation).

European Search Report for Application No. EP 12186886.3 dated Feb. 25, 2013; 6 pages.

G-mail Screenshot representing spell-check functionality available at least as of Oct. 10, 2010, 1 page.

International Search Report & Written Opinion, Patent Cooperation Treaty, PCT Application No. PCT/US2012/057313, dated Mar. 29, 2013. 7 pages.

Quillsoft "What Can I Do With WordQ?" [online] [retrieved from the internet] http://web.archive.org/web/20080623083540/www.wordq.com/wordq2english.html (2008) 3 pages.

Quillsoft "What Can I Do With SpeakQ?" [online] [retrieved from the internet] http://web.archive.org/web/20080611104620/www.wordq.com/speakqenglish.html (2008) 4 pages.

International Preliminary Report on Patentability in International Application No. PCT/US2011/020218, dated May 14, 2015, 8 pages.

International Search Report and Written Opinion in International Application No. PCT/US2011/020218, dated Apr. 24, 2015, 11 pages.

Extended European Search Report issued in European Application No. 11732082.0 dated May 19, 2016, 9 pages.

European Search Report in European Application No. EP16165438, dated Sep. 23, 2016, 8 pages.

Notice of Office Action issued in Korean Application No. 10-2012-7020493, dated Feb. 27, 2017, 17 pages (with English translation).

Office Action issued in Chinese Application No. 20150420200.7, dated Jul. 3, 2017, 11 pages (English translation).

Arisoy et al. "Lattice Extension and Vocabulary Adaptation for Turkish LVCSR," in IEEE Transactions on Audio Speech, and Language Processing, vol. 17(1) Jan. 2009, pp. 163-173.

Jennequin et al. "Modeling Duration via Lattice Rescoring," 2007 IEEE International Conference on Acoustics, Speech and Signal Processing—Apr. 2007, pp. IV-641-IV-644.

Office Action issued in Korean Application No. 10-2017-7017613, dated Sep. 26, 2017, 7 pages (English translation).

Office Action issued in European Application No. 16165438.9, dated Dec. 15, 2017, 5 pages.

(56) References Cited

OTHER PUBLICATIONS

Office Action issued in European Application No. 16165438.9, dated Oct. 16, 2018, 6 pages.

* cited by examiner

CORRECTING VOICE RECOGNITION USING SELECTIVE RE-SPEAK

CROSS-REFERENCE TO RELATED APPLICATIONS

This application claims priority to U.S. Provisional Application Ser. No. 62/153,839, filed Apr. 28, 2015, the entire contents of which are hereby incorporated by reference.

BACKGROUND

The Internet provides access to a wide variety of resources, such as image files, audio files, video files, and web pages. A search system can identify resources in response to queries submitted by users and provide information about the resources in a manner that is useful to the users. The users can navigate through, e.g., click on, search results to acquire information of interest.

SUMMARY

This specification relates to speech recognition, e.g., voice-to-text, in search systems.

Implementations of the present disclosure are generally directed to correcting speech recognition using selective re-speak. More particularly, implementations of the present disclosure are directed to correcting a portion of a textual search query based on re-speaking (by a user) the portion of the textual search query. In some examples, the portion of the textual search query is corrected to provide a corrected textual search query.

In general, innovative aspects of the subject matter described in this specification can be embodied in methods that include actions of providing first text for display on a computing device of a user, the first text being provided from a first speech recognition engine based on first speech received from the computing device, and being displayed as a search query, receiving a speech correction indication from the computing device, the speech correction indication indicating a portion of the first text that is to be corrected, receiving second speech from the computing device, receiving second text from a second speech recognition engine based on the second speech, the second speech recognition engine being different from the first speech recognition engine, replacing the portion of the first text with the second text to provide a combined text, and providing the combined text for display on the computing device as a revised search query. Other implementations of this aspect include corresponding systems, apparatus, and computer programs, configured to perform the actions of the methods, encoded on computer storage devices.

These and other implementations can each optionally include one or more of the following features: the portion includes an entirety of the first text; the portion comprises less than an entirety of the first text; the second speech recognition engine includes the first speech recognition engine and at least one additional function; the at least one additional function includes selecting a potential text as the second text based on one or more entities associated with the first text; actions further include: receiving first search results based on the first text, and providing the first search results for display on the computing device; actions further include: receiving second search results based on the second text, and providing the second search results for display on the computing device in place of the first search results; and the speech correction indication includes user selection of at least one word of a plurality of words of the first text.

Particular implementations of the subject matter described in this specification can be implemented so as to realize one or more of the following advantages. In some examples, correction of a portion of the initial query is faster and more resource efficient. For example, from the user perspective, it is faster/easier to re-speak the portion instead of the entirety of the initial query. From a resource perspective, less bandwidth is required and less computer processing power and/or memory are required to perform speech recognition on the portion, as opposed to the entirety of the initial query. In some examples, user interaction with the computing device is simplified, e.g., the user spelling out a single word instead of an entire query. In some examples, a more complex speech recognition can be used to more accurately convert the second speech to text without consuming increased resources, e.g., because the second speech is shorter than the entirety of the initial query.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to correcting speech recognition using selective re-speak. More particularly, implementations of the present disclosure are directed to correcting a portion of a search query based on a user re-speaking the portion. In some implementations, first text is provided for display to a user, the first text being provided from a first speech recognition engine based on first speech of the user received from the computing device. In some examples, the first text is a search query that is submitted to a search system. In some implementations, the user can indicate a portion of the first text that is to be corrected, and can provide second speech, which is processed using a second speech recognition engine to provide second text. In some implementations, the portion of the first text is replaced with the second text to provide a combined text. In some examples, the combined text is a revised search query that is submitted to the search system.

Figure 1:
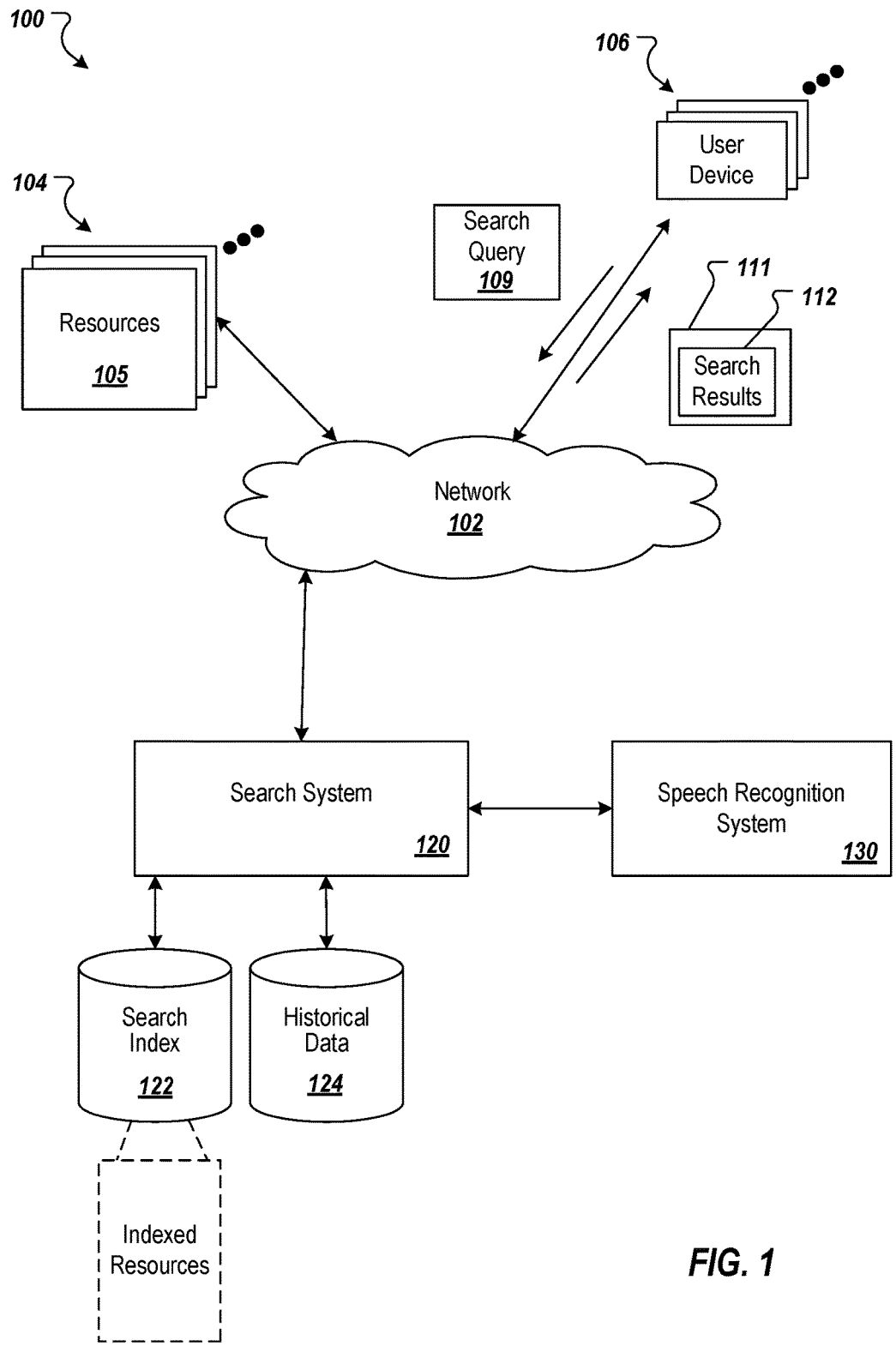
FIG. 1 depicts an example environment in which a search system provides search results.

FIG. 1 depicts an example environment 100 in which a search system provides search results based on user queries. In some examples, the example environment 100 enables users to interact with one or more computer-implemented services. Example computer-implemented services can include a search service, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In the example of FIG. 1, a search system 120 is depicted, which provides a search service, as described in further detail herein.

With continued reference to FIG. 1, the example environment 100 includes a network 102, e.g., a local area network (LAN), wide area network (WAN), the Internet, or a combination thereof, connects web sites 104, user devices 106, and the search system 120. In some examples, the network 102 can be accessed over a wired and/or a wireless communications link. For example, mobile computing devices, such as smartphones can utilize a cellular network to access the network 102. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site.

In some examples, a resource 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is capable of requesting and receiving resources 105 over the network 102. Example user devices 106 include personal computers, laptop computers, and mobile computing devices, e.g., smartphones and/or tablet computing devices, that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 can execute a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 identifying resources 105, and returns the search results display 111 to the user devices 106. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result 112 is data generated by the search system 120 that identifies a resource 105 that is responsive to a particular search query, and includes a link to the resource 105. An example search result 112 can include a web page title, a snippet of text or a portion of an image extracted from the web page, and the URL of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results 112 provided in response to each search query 109 are also stored in the historical data store 124, for example, by the search system 120. These actions can include whether a search result 112 was selected, e.g., clicked or hovered over with a pointer. The selection data can also include, for each selection of a search result 112, data identifying the search query 109 for which the search result 112 was provided.

In some implementations, a user can submit a search query 109 based on speech. For example, the user can speak into a microphone of a user device 106, and the user's speech can be captured as speech data (also referred to as first speech) in a data file. In some examples, the speech data is provided as a search query 109 submitted to the search system 120 through the network 102. In some implementations, the search system 120 can provide the speech data to a speech recognition system 130. In some examples, the speech recognition system 130 can process the speech data to provide text. For example, the speech recognition system 130 can process the speech data using a voice-to-text engine (also referred to as the first speech recognition engine) to provide the text. In some examples, the speech recognition system 130 provides the text to the search system 120, which processes the text as a search query to provide search results 112. In some examples, the search query can be provided for display to the user, e.g., with the search results. In this manner, the user can see how the speech was recognized, and the search query that the search results are based on.

Although the search system 120 and the speech recognition system 130 are depicted as separate systems in the example of FIG. 1, it is appreciated that the search system 120 and the speech recognition system 130 can be included in the same system, e.g., the search system 120 can include the speech recognition system 130 therein.

In accordance with implementations of the present disclosure, the user can correct a portion, e.g., one or more words, of the search query. In some examples, the user can determine that a portion of the search query is incorrect, e.g., the speech recognition for the portion did not accurately recognize the user's speech, and can indicate that the portion is to be corrected. For example, the user can select the portion of the search query displayed to the user using the user device 106. In some implementations, the user again speaks into the microphone of the user device 106, and the user's speech can be captured as portion speech data (also referred to as second speech) in a data file. In some examples, the portion speech data is provided as a re-speak of the portion of the search query and is submitted to the search system 120 through the network 102. In some implementations, the search system 120 can provide the portion speech data to the speech recognition system 130, and can include an indication that the portion speech data corresponds to a re-speak of speech input. In some examples, the speech recognition system 130 can process the portion speech data to provide revised text. For example, the speech recognition system 130 can process the portion speech data using a voice-to-text engine (also referred to as a second speech recognition engine).

In some implementations, the first speech recognition engine used to process the speech data is different from the second speech recognition engine used to process the portion speech data. In some examples, the first speech recognition engine can be used for providing relatively quick processing of the speech data with a less stringent threshold for accuracy, relative to the second speech recognition engine. For example, the first speech recognition engine can use less resources, e.g., processors, memory, and can provide results more quickly than the second speech recognition engine. In some examples, the second speech recognition engine can be used for providing more accurate processing of the portion speech data, e.g., a more stringent threshold for accuracy, relative to the first speech recognition engine. For example, the second speech recognition engine can use more resources, e.g., processors, memory, and can provide results that are more accurate than the first speech recognition engine. In some examples, although the second speech recognition engine is more complex than the first speech recognition engine, and might consume more resources, the speed, at which results are provided can be similar. For example, and as described in further detail herein, the first speech recognition engine can be processing more speech than the second speech recognition engine, e.g., the second speech recognition engine is only processing a portion of the originally submitted speech.

In some implementations, the speech recognition system 130 provides the revised text to the search system 120, which provides a revised search query based on the search query and the revised text. For example, the search system 120 replaces the portion of the search query with the revised text to provide a revised search query. The search system 120 processes the revised search query to provide revised search results 112. In some examples, the revised search query can be provided for display to the user, e.g., with the search results. In this manner, the user can see how the speech was revised, and the search query that the search results are based on.

Figure 2A:
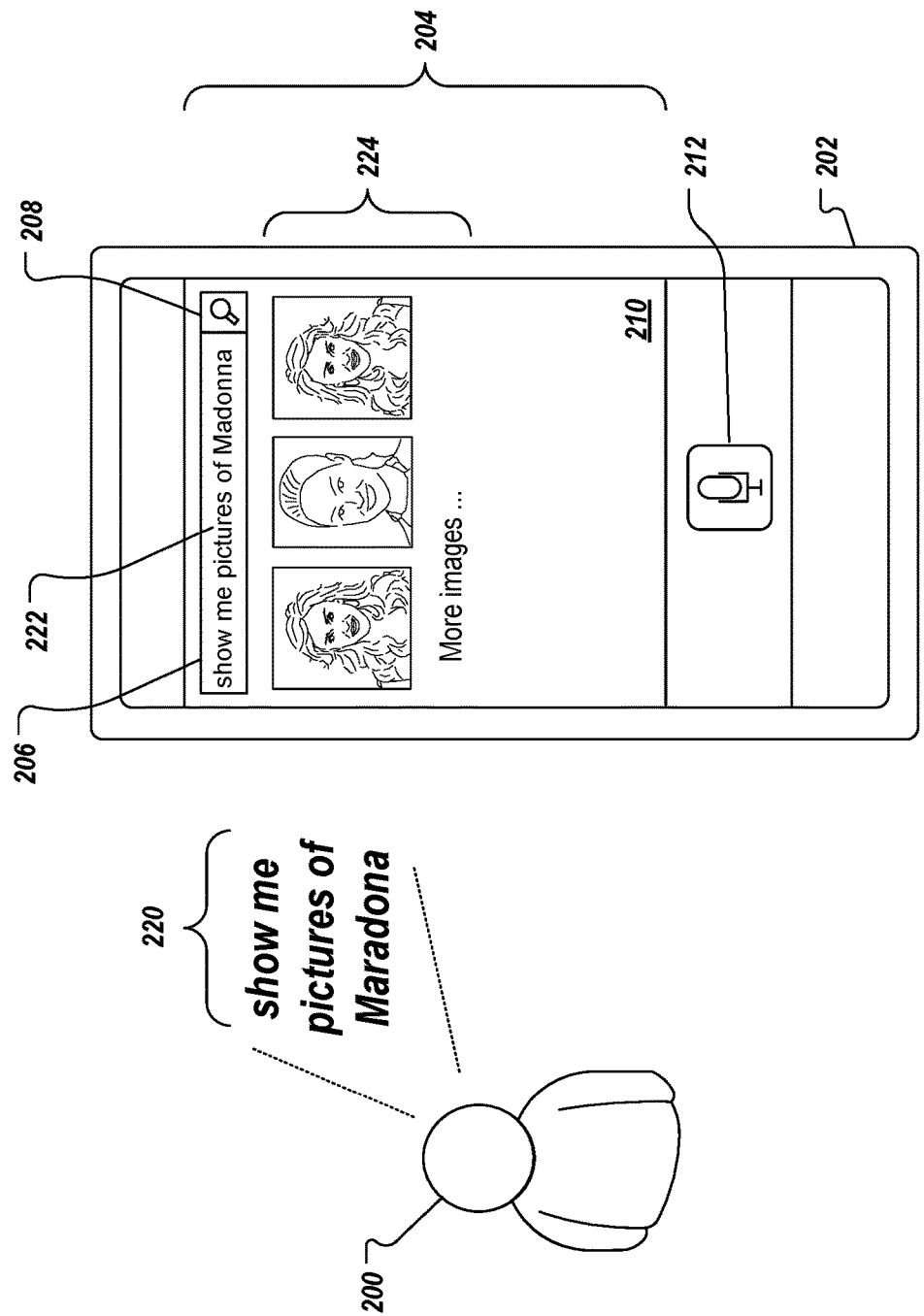
FIGS. 2A-2D depict an example use case in accordance with implementations of the present disclosure.

FIGS. 2A-2D depict an example use case in accordance with implementations of the present disclosure. With particular reference to FIG. 2A, a user 200 uses a computing device 202 to conduct searching. More particularly, the user 200 uses the computing device 202 to submit search queries to a search system, e.g., the search system 120 of FIG. 1, which provides search results for display to the user on the computing device 202. In the depicted example, the computing device 202 is provided as a mobile computing device, e.g., a smartphone, a tablet. It is appreciated, however, that implementations of the present disclosure can be realized using any appropriate type of computing device, e.g., desktop computer, laptop computer, wearable computing device, such as a smartwatch.

In the depicted example, the computing device 202 displays a search interface 204 that the user 200 can use to submit search queries and receive search results. The example search interface 204 includes a search box 206, a search button 208, a search results area 210, and a microphone button 212. In some examples, search queries submitted to the search system are displayed in the search box 206, and the resulting search results a displayed in the search results area 210. In some examples, the user 200 can select the search button 208 to initiate submission of the search query to the search system. In some examples, the search query is automatically submitted to the search system without requiring the user to select the search button 208.

In accordance with implementations of the present disclosure, the user 200 provides first speech 220 as input to the search interface 204. In the depicted example, the first speech 220 includes the query [show me pictures of Maradona]. In some examples, the computing device 202 records the first speech 220 using a microphone, and generates one or more data files, e.g., .wav files, .mp3 files, that store the first speech 220 as audio data. In some implementations, the computing device 202 provides the first speech 220 to the search system. In some examples, the first speech 220 is automatically provided to the search system, e.g., the user is not required to select the search button 208. In some examples, the first speech 220 is transmitted to the search system, after the user has spoken the entirety of the first speech 220. For example, the search system 120 receives the entirety of the first speech 220 in one request. In some examples, portions of the first speech 220 are transmitted to the search system as they are spoken. For example, the search systems receives portions, e.g., words, of the first speech 220 as each portion is spoken.

In some implementations, and as described in further detail herein, the first speech 220 is processed by a speech recognition system, e.g., the speech recognition system 130 of FIG. 1, to provide first text, e.g., a textual search query. For example, the search system can provide the audio data to the speech recognition system for processing. In some examples, the speech recognition system processes the first speech 220 using a first speech recognition engine to provide the first text.

In some implementations, the first text is provided for display on the computing device 202. In some examples, the search system receives the first text from the speech recognition system and transmits the first text to the computing device 202. In some examples, the first text is displayed in the search box 206 as a search query 222. In some examples, the search system processes the first text as a search query to provide search results, at least some of which are sent to the computing device 202 and are displayed as search results 224 in the search results area 210. In some examples, the search query 222 is displayed to the user before the search results 224 are received and displayed by the computing device 202. For example, the first text can be received and displayed as the search query 222 in the search box 206, and the search results 224 can be subsequently received and displayed, e.g., there can be a time lag between display of the search query 222, and display of the search results 224.

In the depicted example, the search query 222 is provided as [show me pictures of Madonna]. Accordingly, the word [Maradona] was incorrectly recognized as [Madonna] by the speech recognition system. Consequently, the search results 224 include images of Madonna, the singer-songwriter, actress, and producer. That is, the search query 222, which the search results 224 are based on, is incorrect, as it should be provided as [show me pictures of Maradona].

In accordance with implementations of the present disclosure, the user 200 can correct a portion of the search query 222 to provide a revised search query, which can be submitted to the search system. In some implementations, the user 200 can provide a speech correction indication, which indicates the portion of the search query 222, e.g., the first text, that is to be corrected. For example, the user can select one or more words of the search query 222, which are to be corrected. In some examples, the user 200 can tap on the portion, e.g., the computing device 202 including a touchscreen device.

Figure 2B:
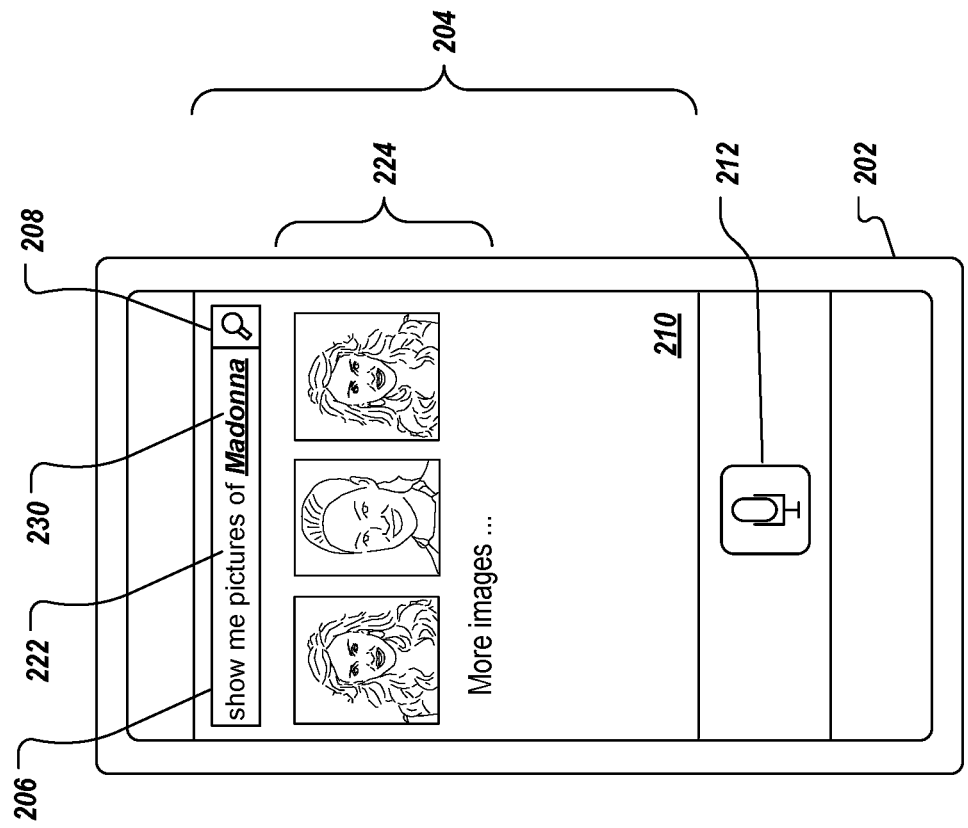
Figure 2B:
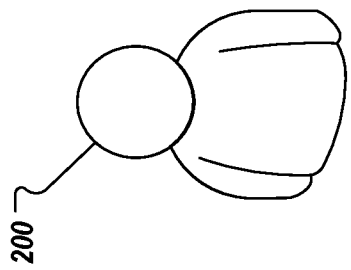

FIG. 2B depicts a portion 230 of the search query 222 that is to be corrected. In the depicted example, the user 200 selected the word [Madonna] to be corrected.

Figure 2C:
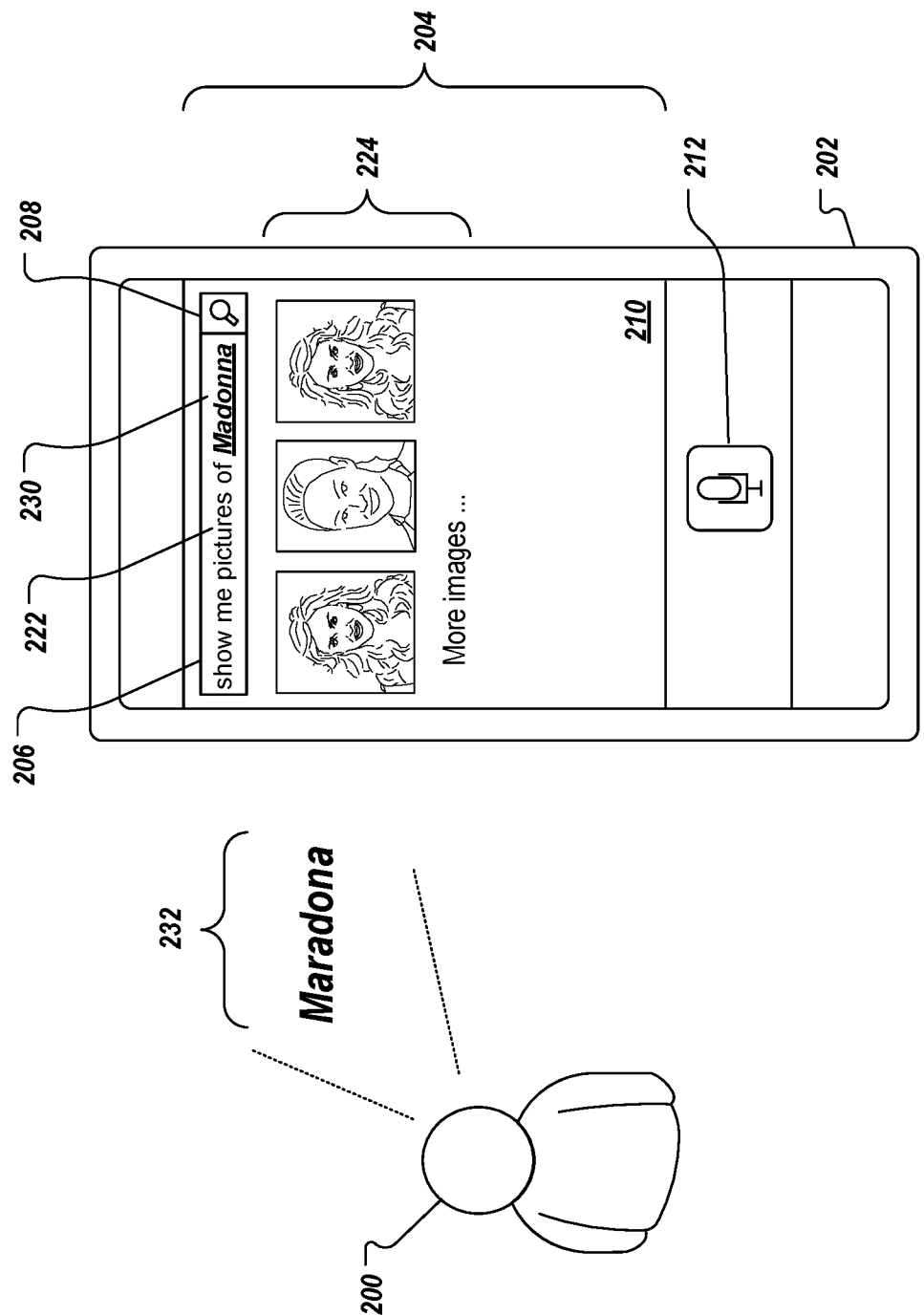

FIG. 2C depicts the user 200 re-speaking the portion 230. In the depicted example, the user 200 provides second speech 232 as input to the search interface 204. In the depicted example, the second speech 232 includes [Maradona]. In some examples, the user 200 can spell out the portion 230 that is to be corrected. In the examples of FIGS. 2A-2C, the user 200 can spell out the second text 232, e.g., "M-A-R-A-D-O-N-A." In some examples, the computing device 202 records the second speech 232 using the microphone, and generates one or more data files, e.g., .wav files, .mp3 files, that store the second speech 232 as audio data. In some implementations, the computing device 202 provides the second speech 232 to the search system. In some examples, the second speech 232 is automatically provided to the search system, e.g., the user is not required to select the search button 208.

In some implementations, and as described in further detail herein, the second speech 232 and an indication that the second speech 232 corresponds to a portion that is to be corrected (also referred to as a correction indication) are provided to the speech recognition system. In some examples, the second speech 232 is processed by the speech recognition system to provide second text. In some examples, and in response to also receiving the correction indication, the speech recognition system processes the second speech 232 using a second speech recognition engine to provide the second text. In some examples, and as described in further detail herein, the second speech recognition engine is different from the first speech recognition engine.

In accordance with implementations of the present disclosure, a combined text is provided based on the first text and the second text. In some implementations, the portion of the first text, e.g., [Madonna] in the depicted example, is deleted from the first text and is replaced by the second text, e.g., [Maradona], to provide the combined text. In some implementations, the search system receives the second text from the speech recognition system and provides the combined text based on the first text and the second text.

Figure 2D:
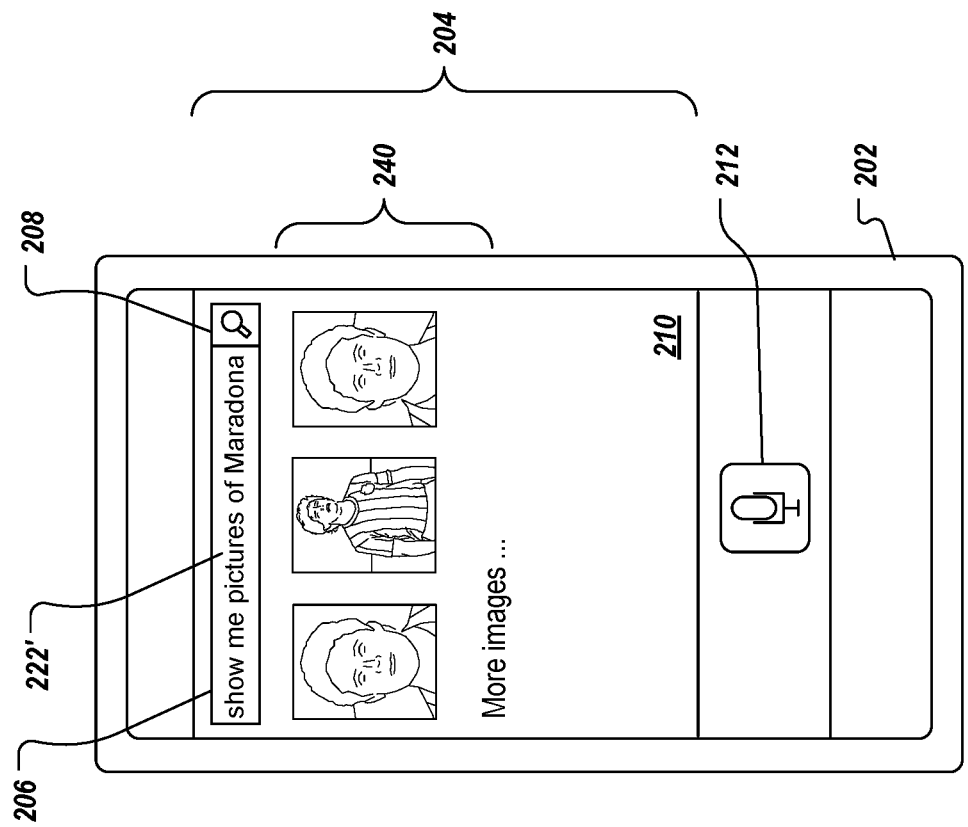
Figure 2D:
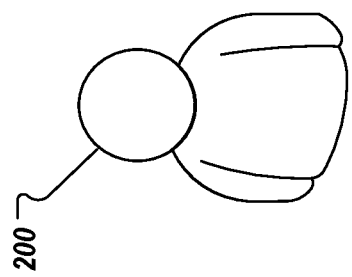

Referring now to FIG. 2D, and in some implementations, the combined text is provided for display on the computing device 202. In some examples, the search system transmits the combined text to the computing device 202. In some examples, the combined text is displayed in the search box 206 as a revised search query 222'. In some examples, the search system processes the combined text as a search query to provide search results, at least some of which are sent to the computing device 202 and are displayed as search results 240 in the search results area 210. In some examples, the revised search query 222' is displayed to the user before the search results 240 are received and displayed by the computing device 202. For example, the combined text can be received and displayed as the revised search query 222' in the search box 206, and the search results 240 can be subsequently received and displayed, e.g., there can be a time lag between display of the revised search query 222', and display of the search results 240.

In some implementations, and as depicted in the example of FIGS. 2A-2D, the user selects the portion of text that is to be corrected, and speaks the correction, e.g., selects [Madonna] and speaks [Maradona], e.g., as the second speech. In some examples, the microphone of the computing device is automatically activated in response to user selection of the portion of text that is to be corrected. In some examples, the user selects the portion of text that is to be corrected, and the user activates the microphone, e.g., selects the microphone button 212.

In some implementations, the instead of re-speaking the portion that is to be corrected, the user speaks a phrase that provides context to the portion that is to be corrected. For example, and continuing with the example of FIGS. 2A-2D, instead of speaking [Maradona] or [M-A-R-A-D-O-N-A], as described above, the user can speak [I meant the soccer player], e.g., as the second speech, which provides context to the selected portion that is to be corrected. In some examples, the context can be used to discern between potential corrections to the portion, as described in further detail herein.

In some implementations, a portion that is to be corrected is not explicitly selected by the user. In the example of FIGS. 2A-2D, the user selected the word [Madonna], e.g., by tapping [Madonna] on the touchscreen of the computing device. In some examples, and instead of selecting a portion, the user can provide second speech to provide context for the correction, which second speech is processed to determine the portion that is to be corrected, and to provide the second text used to correct the portion. For example, and continuing with the example of FIGS. 2A-2D, the second speech can include [no, I meant the soccer player], [I meant Maradona], [change Madonna to Maradona], or [delete Madonna]. Accordingly, the second speech provides context to select the portion that is to be corrected, and can be used to discern between potential corrections to the portion, as described in further detail herein. In some examples, the user activates the microphone, e.g., selects the microphone button 212, before providing the second speech.

In some implementations, the microphone is automatically activated in the event that a portion is to be corrected. For example, and as discussed above, the microphone can be automatically activated in response to user selection of a portion that is to be corrected. In some examples, the microphone can be automatically activated after the search query is displayed to the user. In this manner, the user can provide second speech without requiring the user to first activate the microphone.

Figure 3:
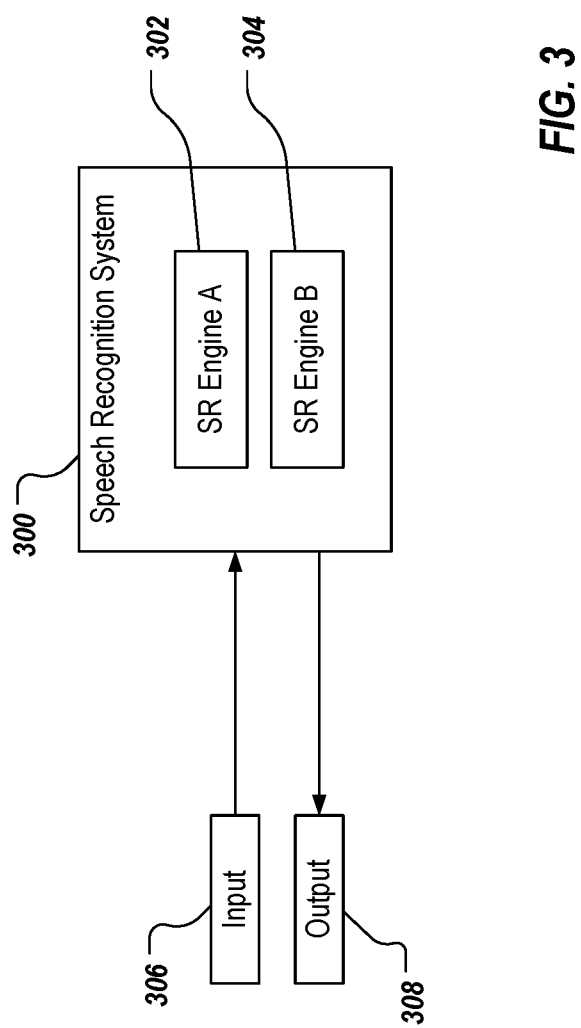
FIG. 3 depicts an example speech recognition system in accordance with implementations of the present disclosure.

FIG. 3 depicts an example speech recognition system 300 in accordance with implementations of the present disclosure. The example speech recognition system 300 includes a first speech recognition engine 302, and a second speech recognition engine 304. In some examples, the speech recognition system 300 receives input data 306, processes the input data 306 using the first speech recognition engine 302 or the second speech recognition engine 304, and provides output data 308. In some examples, the input data 306 is provided to the speech recognition system 300 from a search system, and the speech recognition system 300 provides the output data to the search system.

In some implementations, the input data 306 includes audio data of first speech (speech data) provided by a user to the search system. With reference to the example of FIGS. 2A-2D, the input data 306 can include an audio file of the first speech [show me pictures of Maradona]. In some examples, the first speech recognition engine 302 processes the input data 306 to provide the output data 308. In some implementations, the output data 308 is first text based on the audio data. With reference to the example of FIGS. 2A-2D, the output data 308 can include a text file including first text, e.g., [show me pictures of Madonna].

In some examples, the first text can be selected by the first speech recognition engine based on a set of potential texts. In some examples, the first text is selected from the set of potential texts based on respective confidence scores associated with the potential texts. For example, and using the example of FIGS. 2A-2D, the first speech can be processed to provide [show me pictures of Madonna] and [show me pictures of Maradona]. In this example, [show me pictures of Madonna] is associated with a first confidence score, e.g., 95%, and [show me pictures of Maradona] is associated with a second confidence score, e.g., 92%. It can be determined that the first confidence score exceeds the second confidence score. Consequently, [show me pictures of Madonna] is selected as the first text. In other words, the potential text in the set of potential texts having the highest confidence score can be selected as the first text.

In some implementations, the input data 306 includes audio data of second speech (portion speech data) provided by the user to the search system, and a correction indication. With reference to the example of FIGS. 2A-2D, the input data 306 can include an audio file of the second speech [Maradona], and a correction indication. In some examples, the second speech recognition engine 304 processes the input data 306 to provide the output data 308.

For example, in response to the input data 306 including the correction indication, the second speech recognition engine 304 is used to process the audio data. In some implementations, the output data 308 is second text based on the audio data. With reference to the example of FIGS. 2A-2D, the output data 308 can include a text file including second text, e.g., [Maradona].

In some implementations, the first speech recognition engine 302 is different from the second speech recognition engine 304. In some examples, the first speech recognition engine 302 can be used for providing relatively quick processing of the speech data with a less stringent threshold for accuracy, relative to the second speech recognition engine 304. For example, the first speech recognition engine 302 can implement a less complex, less accurate speech recognition algorithm relative to the second speech recognition engine 304. In this manner, the first speech recognition engine 302 can provide relatively quick results and can use less resources, e.g., processors, memory, than the second speech recognition engine 304. In some examples, the second speech recognition engine 304 can be used for providing more accurate processing of the portion speech data, e.g., a more stringent threshold for accuracy, relative to the first speech recognition engine 302. For example, the second speech recognition engine 304 can implement a more complex, more accurate speech recognition algorithm relative to the first speech recognition engine 302. In this manner, the second speech recognition engine 304 would provide relatively slower results and can use more resources, e.g., processors, memory, than the first speech recognition engine 304, if processing the same audio data.

In some implementations, although the second speech recognition engine 302 is more complex than the first speech recognition engine 304, the speed at which results are provided and the amount of resources used to provide the results can be similar. For example, and as described in further detail herein, the first speech recognition engine 302 can be processing more audio data than the second speech recognition engine 304, e.g., the second speech recognition engine 304 is only processing a portion of the originally submitted speech. With reference to the example of FIGS. 2A-2D, the first speech recognition engine 302 processes the text [show me pictures of Maradona], while the second speech recognition engine 304 processes only the text [Maradona].

As described above, the first speech recognition engine is different from the second speech recognition engine. In some examples, the second speech recognition is different from in that the second speech recognition includes the first speech recognition engine, as well as additional functionality and/or different parameters for processing the second speech. That is, and in some examples, the second speech recognition engine is the first speech recognition with additional functionality and/or different parameters for processing the second speech.

In some implementations, the second speech is processed to provide a set of potential texts, from which the second text can be determined. In some examples, a text that is included in the first text is excluded from selection from the set of potential texts that is provided based on the second speech. For example, the portion of text that is to be corrected can be excluded from selection from the set of potential texts. Continuing with the example of FIGS. 2A-2D, the second speech can include [Maradona], which can be processed to provide a set of potential texts that includes [Madonna] and [Maradona], for example. Because [Madonna] is already included in the first text, e.g., and was selected for correction, [Madonna] is excluded from selection for the second text. Consequently, the potential text [Maradona] is selected as the potential text.

In some implementations, and in response to the second speech, the potential texts used to determine the first text can be processed to have respective entities associated with each. In some examples, the second speech can be processed and one or more entities can be associated therewith. In some implementations, entities associated with the second speech can be compared to entities associated with each of the potential texts in the set of potential texts. In some examples, the potential text having at least one entity that matches an entity associated with the second speech is selected.

By way example, and using the example of FIGS. 2A-2D, the first speech can be processed to provide [show me pictures of Madonna] and [show me pictures of Maradona]

as potential texts in a set of potential texts. In some examples, [show me pictures of Madonna] can be associated with the entities [singer], [actress], [producer], and [musician], among others, and [show me pictures of Maradona] can be associated with the entities [athlete], [soccer player], and [footballer], among others. In some examples, the second speech is provided as [I meant the soccer player], and can be associated with the entities [sport], [soccer], and [soccer player]. It can be determined that the potential text and the second speech have the entity [soccer player] in common. Consequently, the potential text [show me pictures of Maradona] can be selected as the corrected text, e.g., combined text.

In some implementations, a plurality of entities and information associated therewith can be stored as structured data in a knowledge graph. In some examples, a knowledge graph includes a plurality of nodes and edges between nodes. In some examples, a node represents an entity and an edge represents a relationship between entities. In some examples, the knowledge graph can be provided based on an example schema that structures data based on domains, types and properties. In some examples, a domain includes one or more types that share a namespace. In some examples, a namespace is provided as a directory of uniquely named objects, where each object in the namespace has a unique name, e.g., identifier. In some examples, a type denotes an "is a" relationship about a topic, and is used to hold a collection of properties. In some examples, a topic represents an entity, such as a person, place or thing. In some examples, each topic can have one or more types associated therewith. In some examples, a property is associated with a topic and defines a "has a" relationship between the topic and a value of the property. In some examples, the value of the property can include another topic.

Figure 4:
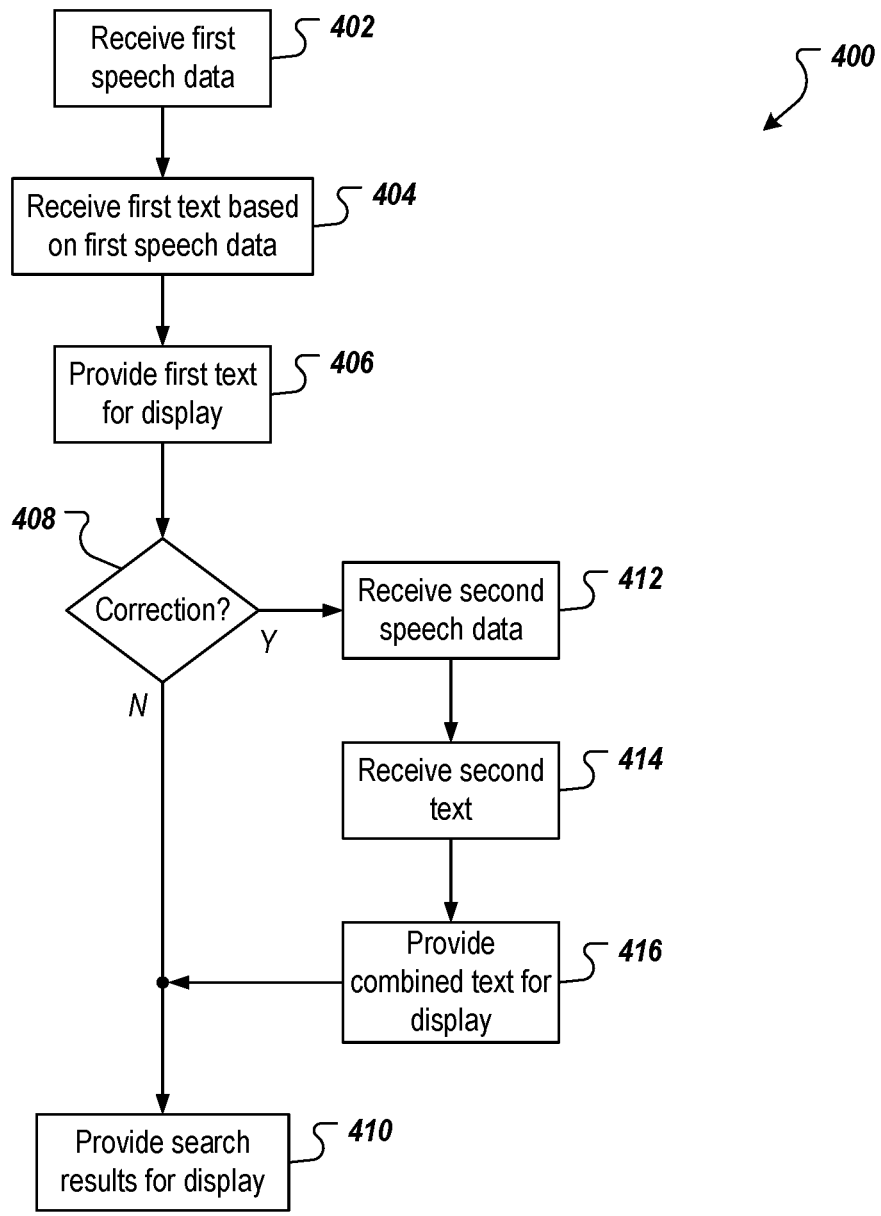
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the example environment 100 of FIG. 1, e.g., the search system 120 and/or the speech recognition system 130. In some examples, the example process 400 can be provided by one or more computer-executable programs executed using one or more computing devices.

First speech data is received (402). For example, a search system, e.g., the search system 120 of FIG. 1, receives first speech data from a user device. First text based on the first speech data is received (404). For example, the search system receives the first text from a speech recognition system, e.g., the speech recognition system 130 of FIG. 1. In some examples, the search system provides the first speech data to the speech recognition system.

The first text is provided for display (406). For example, the search system transmits the first text for display to the user device, e.g., displaying the first text as a search query in a search box of a search interface. It is determined whether a correction to the first text has been indicated (408). For example, the search system can receive a correction indication from the user device. In some examples, the correction indication can be provided in response to a user of the user device selecting a portion of the first text. In some examples, the correction indication can be provided in response to the user providing subsequent speech input. If a correction indication is not received, search results are provided for display (410). For example, the search system can determine search results that are responsive to the first text, as a search query, and can provide the search results for display.

If a correction indication is received, second speech data is received (412). For example, the search system receives second speech data from the user device. Second text based on the second speech data is received (414). For example, the search system receives the second text from a speech recognition system. In some examples, the search system provides the second speech data to the speech recognition system. Combined text is provided for display (416). For example, the search system transmits the combined text for display to the user device, e.g., displaying the combined text as a revised search query in the search box of the search interface. In some examples, the search system provides the combined text based on the first text and the second text. For example, the portion of the first text that is to be corrected can be replaced by the second text. In some examples, the portion of the first text is the entirety of the first text. In some examples, the portion of the first text is less than the entirety of the first text. Search results are provided for display (410). For example, the search system can determine search results that are responsive to the combined text, as a revised search query, and can provide the search results for display.

The example process 400 of FIG. 4 includes providing search results for display after the first text has been provided for display, e.g., as a search query, or after the combined text has been provided for display, e.g., as a revised search query. It is contemplated, however, that search results can be displayed relatively concurrent with display of either the first text or the combined text. For example, in some implementations, the first text and the search results based on the first text can be displayed before it is determined whether correction is to be made to the first text.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by a server system comprising one or more computers, the method comprising:

providing, by the server system, first text for display on a computing device of a user, the first text being received from a first speech recognition engine, the first speech recognition engine having converted first speech received from the computing device into the first text by processing the first speech to generate multiple potential texts and associating each of the multiple potential texts with a respective plurality of entities, and the first text being displayed as a search query prior to executing the search query to obtain search results;

receiving, by the server system, a speech correction indication from the computing device, the speech correction indication (i) initiating a correction of the first text, (ii) providing context to select a portion of the first text that is to be corrected without explicitly indicating the portion of the first text to be corrected and without repeating the first text, and (iii) providing context for selecting second text to correct the portion of the first text without explicitly reciting the second text prior to executing the search query to obtain search results;

processing, by the server system, the speech correction indication to determine both (i) the portion of the first text that is to be corrected and (ii) the second text to correct the portion of the first text prior to executing the search query to obtain search results, the second text determined based on associating second speech with a second respective plurality of entities and selecting as the second text one of the multiple potential texts generated from the first speech and associated with the respective plurality of entities that best matches the second respective plurality of entities associated with the second speech;

replacing, by the server system, the portion of the first text with the second text to provide a combined text prior to executing the search query to obtain search results; and providing, by the server system, the combined text for display on the computing device as a revised search query.

2. The method of claim 1, wherein the portion comprises an entirety of the first text.

3. The method of claim 1, wherein the portion comprises less than an entirety of the first text.

4. The method of claim 1, wherein a second speech recognition engine is configured to select a potential text as the second text based on one or more entities associated with the first text.

5. The method of claim 1, further comprising:
receiving search results based on the revised search query; and
providing the search results for display on the computing device.

6. A system comprising:
one or more computers and one or more storage devices on which are stored instructions that are operable, when executed by the one or more computers, to cause the one or more computers to perform operations comprising:

providing first text for display on a computing device of a user, the first text being received from a first speech recognition engine, the first speech recognition engine having converted first speech received from the computing device into the first text by processing the first speech to generate multiple potential texts and associating each of the multiple potential texts with a respective plurality of entities, and the first text being displayed as a search query prior to executing the search query to obtain search results;

receiving a speech correction indication from the computing device, the speech correction indication (i) initiating a correction of the first text, (ii) providing context to select a portion of the first text that is to be corrected without explicitly indicating the portion of the first text to be corrected and without repeating the first text, and (iii) providing context for selecting second text to correct the portion of the first text without explicitly reciting the second text prior to executing the search query to obtain search results;

processing the speech correction indication to determine both (i) the portion of the first text that is to be corrected and (ii) the second text to correct the portion of the first text prior to executing the search query to obtain search results, the second text determined based on associating second speech with a second respective plurality of entities and selecting as the second text one of the multiple potential texts generated from the first speech and associated with the respective plurality of entities that best matches the second respective plurality of entities associated with the second speech;

replacing the portion of the first text with the second text to provide a combined text prior to executing the search query to obtain search results; and providing the combined text for display on the computing device as a revised search query.

7. The system of claim 6, wherein the portion comprises an entirety of the first text.

8. The system of claim 6, wherein the portion comprises less than an entirety of the first text.

9. The system of claim 6, wherein a second speech recognition engine is configured to select a potential text as the second text based on one or more entities associated with the first text.

10. The system of claim 6, wherein operations further comprise:
receiving search results based on the revised search query; and
providing the search results for display on the computing device.

11. The system of claim 6, wherein the operations further comprise: recognizing in the second text an expression that signifies "I meant".

12. A non-transitory computer readable medium storing instructions that, when executed by one or more computers, cause the one or more computers to perform operations comprising:
- providing first text for display on a computing device of a user, the first text being received from a first speech recognition engine, the first speech recognition engine having converted first speech received from the computing device into the first text by processing the first speech to generate multiple potential texts and associating each of the multiple potential texts with a respective plurality of entities, and the first text being displayed as a search query prior to executing the search query to obtain search results;
- receiving a speech correction indication from the computing device, the speech correction indication (i) initiating a correction of the first text, (ii) providing context to select a portion of the first text that is to be corrected without explicitly indicating the portion of the first text to be corrected and without repeating the first text, and (iii) providing context for selecting second text to correct the portion of the first text without explicitly reciting the second text prior to executing the search query to obtain search results;
- processing the speech indication to determine both (i) the portion of the first text that is to be corrected and (ii) the second text to correct the portion of the first text prior to executing the search query to obtain search results, the second text determined based on associating second speech with a second respective plurality of entities and selecting as the second text one of the multiple potential texts generated from the first speech and associated with the respective plurality of entities that best matches the second respective plurality of entities associated with the second speech;
- replacing the portion of the first text with the second text to provide a combined text prior to executing the search query to obtain search results; and
- providing the combined text for display on the computing device as a revised search query.

13. The non-transitory computer readable medium of claim 12, wherein the portion comprises an entirety of the first text.

14. The non-transitory computer readable medium of claim 12, wherein the portion comprises less than an entirety of the first text.

15. The non-transitory computer readable medium of claim 12, wherein a second speech recognition engine is configured to select a potential text as the second text based on one or more entities associated with the first text.

* * * * *